(12) United States Patent
Lee et al.

(10) Patent No.: US 10,181,086 B2
(45) Date of Patent: Jan. 15, 2019

(54) IMAGE ANALYSIS METHOD FOR EXTRACTING FEATURE OF IMAGE AND APPARATUS THEREFOR

(71) Applicant: POSTECH ACADEMY-INDUSTRY FOUNDATION, Pohang-si (KR)

(72) Inventors: Seung Yong Lee, Pohang-si (KR); Hui Jin Lee, Pohang-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 6 days.

(21) Appl. No.: 15/442,558

(22) Filed: Feb. 24, 2017

(65) Prior Publication Data

US 2018/0197032 A1    Jul. 12, 2018

(30) Foreign Application Priority Data

Jan. 11, 2017    (KR) ........................ 10-2017-0004368

(51) Int. Cl.
| | | |
|---|---|---|
| *G06K 9/62* | (2006.01) | |
| *G06K 9/03* | (2006.01) | |
| *G06K 9/46* | (2006.01) | |
| *G06K 9/44* | (2006.01) | |
| *G06K 9/48* | (2006.01) | |

(52) U.S. Cl.
CPC ............ *G06K 9/036* (2013.01); *G06K 9/44* (2013.01); *G06K 9/4619* (2013.01); *G06K 9/481* (2013.01); *G06K 9/6267* (2013.01); *G06K 9/6269* (2013.01)

(58) Field of Classification Search
CPC .......... G06T 7/001; G06T 2207/20081; G06T 2207/10096; G06T 2207/30108

USPC ............ 382/141, 143, 149, 152, 156, 159; 348/86, 125, 126

See application file for complete search history.

(56) References Cited

U.S. PATENT DOCUMENTS

| | | | | |
|---|---|---|---|---|
| 6,539,106 B1 * | 3/2003 | Gallarda | ............ | G01R 31/307 382/149 |
| 7,126,255 B2 * | 10/2006 | Yamaguchi | ........... | B81B 3/0086 310/324 |
| 7,167,583 B1 * | 1/2007 | Lipson | ..................... | G06K 9/00 361/720 |
| 7,333,650 B2 * | 2/2008 | Yamamoto | ........... | G06K 9/3233 382/145 |
| 7,558,419 B1 * | 7/2009 | Ye | ............................ | G03F 1/84 382/144 |
| 7,986,806 B2 * | 7/2011 | Rhoads | ............ | G06F 17/30876 235/462.34 |

(Continued)

*Primary Examiner* — Yosef Kassa
(74) *Attorney, Agent, or Firm* — Morgan, Lewis & Bockius LLP

(57) ABSTRACT

An image analysis method for extracting features of an image and an apparatus for the same are disclosed. An image analysis method performed in an image analysis apparatus may comprise extracting a plurality of features for a plurality of sample images through a pre-learned model to extract features from the plurality of sample images; determining a plurality of target features representing final features to be extracted through the image analysis apparatus; encoding the plurality of features based on a probability distribution of the plurality of target features for the plurality of features; and analyzing a plurality of analysis target images based on the plurality of encoded features when the plurality of analysis target images are received.

18 Claims, 5 Drawing Sheets

(56) References Cited

U.S. PATENT DOCUMENTS

| | | | | |
|---|---|---|---|---|
| 8,131,059 B2* | 3/2012 | Taguchi | ............... | G06T 7/001 |
| | | | | 382/141 |
| 8,405,873 B2* | 3/2013 | Harada | ............... | H04N 1/41 |
| | | | | 358/1.9 |
| 8,553,037 B2* | 10/2013 | Smith | ............... | G06T 13/40 |
| | | | | 345/473 |
| 2016/0140425 A1 | 5/2016 | Kulkarni et al. | | |
| 2016/0358024 A1 | 12/2016 | Krishnakumar et al. | | |

* cited by examiner

US 10,181,086 B2

IMAGE ANALYSIS METHOD FOR EXTRACTING FEATURE OF IMAGE AND APPARATUS THEREFOR

CLAIM FOR PRIORITY

This application claims priority to Korean Patent Application No. 2017-0004368 filed on Jan. 11, 2017 in the Korean Intellectual Property Office (KIPO), the entire contents of which are hereby incorporated by reference.

BACKGROUND

1. Technical Field

The present disclosure relates to an image analysis technology, and more particularly, to an image analysis method for quality evaluation of images and extraction of image features related to aesthetic factors and an apparatus for the same.

2. Related Art

Recently, as a technology for acquiring or supplying various kinds of images has been rapidly developed, many users can easily obtain vast amounts of images. The development of such the technology has increased user's expectations for high quality images. Accordingly, technologies for automatically evaluating qualities of images and analyzing aesthetic factors of images have been developed in order to satisfy users' expectations.

Here, the technology of evaluating a quality of an image may include a technique of classifying a quality of a given image into high quality and low quality according to predetermined criteria. The technology for evaluating the quality of the image is one of the techniques necessary for efficiently managing a large amount of images that are encountered by the user.

Further, the technology of analyzing aesthetic factors of an image is to analyze the aesthetic factors of the image such as sharpness of the image corresponding to the aesthetic factors (for example, motion blur, color and structure, etc.) of the image. The technology for analyzing aesthetic factors of an image is one of techniques that can be usefully applied to various applications for generating aesthetic images.

Specifically, the technology for evaluating image quality predefines aesthetic factors that may affect the composition of an aesthetic image, and designs a mathematical model to express defined aesthetic factors. The mathematical model designed to express the aesthetic factors is also used as an index to analyze the aesthetic factors of the image.

However, there is a limit to be used to evaluate the quality of the actual image and to analyze the aesthetic factors based on the mathematical model thus designed. That is, there is a problem that the designed mathematical model may not sufficiently express various and complex features of the image. Also, the evaluation of the image quality and the analysis of the aesthetic factors by merely the aesthetic factors defined by the mathematical model have a problem in that an inaccurate analysis is performed on the image.

SUMMARY

Accordingly, exemplary embodiments of the present disclosure are provided to substantially obviate one or more problems due to limitations and disadvantages of the related art.

Exemplary embodiments of the present disclosure provide image analysis methods for quality evaluation of images and extraction of features of features related to aesthetic factors and apparatuses for the same.

Technical objects of the present disclosure are not limited to the aforementioned technical objects and other technical objects which are not mentioned will be apparently appreciated by those skilled in the art from the following description.

In order to achieve the above-described objective, an aspect of the present disclosure provides an image analysis method performed in an image analysis apparatus. The method may comprise extracting a plurality of features for a plurality of sample images through a pre-learned model to extract features from the plurality of sample images; determining a plurality of target features representing final features to be extracted through the image analysis apparatus; encoding the plurality of features based on a probability distribution of the plurality of target features for the plurality of features; and analyzing a plurality of analysis target images based on the plurality of encoded features when the plurality of analysis target images are received.

The pre-learned model may be a pre-learned model based on a deep convolution neural network (DCNN) to extract the features of the plurality of sample images.

The plurality of target features may include a feature for classifying based on qualities of the plurality of sample images, and the qualities of the plurality of sample images may include high quality and low quality.

The plurality of target features may include a feature for classifying based on aesthetic factors of the plurality of sample images, and the aesthetic factors of the plurality of sample images may include at least one of a complementary color, a motion blur, a rule of thirds, a depth of field (DOF), and a vanishing point.

The encoding the plurality of features may comprise converting the plurality of features into vectors to generate a plurality of first vectors; converting the plurality of target features into vectors to generate a plurality of second vectors; calculating a probability distribution of the plurality of second vectors for the plurality of first vectors; and encoding the plurality of features based on the calculated probability distribution.

In the encoding the plurality of features, the plurality of features may be encoded through a restricted Boltzmann machines (RBM) model that classifies the plurality of first vectors based on a joint distribution of the plurality of second vectors.

In the encoding the plurality of features, the plurality of features may be encoded such that a cross entropy value is minimized to minimize a difference between the plurality of first vectors and the plurality of second vectors.

In the encoding the plurality of features, the plurality of features may be encoded by applying a classification model learned previously based on support vector machine (SVM) so that the plurality of second vectors have differentiations for distinguishing between the plurality of second vectors.

In the encoding the plurality of features, the plurality of second vectors may be compared with a predetermined threshold, and the plurality of features may be encoded based on a result of the comparison such that a joint distribution of the plurality of second vectors for the plurality of first vectors has a sparsity.

The analyzing the plurality of analysis target images may comprise learning the plurality of encoded features by classifying the plurality of sample images based on the plurality of encoded features; and analyzing the plurality of analysis target images based on the plurality of learned features when the plurality of analysis target images are received.

In order to achieve the above-described objective, another aspect of the present disclosure provides an image analysis apparatus comprising a processor; and a memory storing at least one instruction executed by the processor, wherein the at least one instruction is configured to extract a plurality of features from a plurality of sample images through a pre-learned model to extract features from the plurality of sample images; determine a plurality of target features representing final features to be extracted through the image analysis apparatus; encode the plurality of features based on a probability distribution of the plurality of target features for the plurality of features; and analyze the plurality of analysis target images based on the plurality of encoded features when the plurality of analysis target images are received.

The pre-learned model may be a pre-learned model based on a deep convolution neural network (DCNN) to extract the features of the plurality of sample images.

The plurality of target features may include a feature for classifying based on qualities of the plurality of sample images, and the qualities of the plurality of sample images may include high quality and low quality.

The plurality of target features may include a feature for classifying based on aesthetic factors of the plurality of sample images, and the aesthetic factors of the plurality of sample images may include at least one of a complementary color, a motion blur, a rule of thirds, a depth of field (DOF), and a vanishing point.

In the encoding the plurality of features, the at least one instruction may be further configured to convert the plurality of features into vectors to generate a plurality of first vectors; convert the plurality of target features into vectors to generate a plurality of second vectors; calculate a probability distribution of the plurality of second vectors for the plurality of first vector; and encode the plurality of features based on the calculated probability distribution.

In the encoding the plurality of features, the at least one instruction may be further configured to encode the plurality of features through a restricted Boltzmann machines (RBM) model that classifies the plurality of first vectors based on a joint distribution of the plurality of second vectors.

In the encoding the plurality of features, the at least one instruction may be further configured to encode the plurality of features such that a cross entropy value is minimized to minimize a difference between the plurality of first vectors and the plurality of second vectors.

In the encoding the plurality of features, the at least one instruction may be further configured to encode the plurality of features by applying a classification model pre-learned based on support vector machine (SVM) so that the plurality of second vectors have differentiations for distinguishing between the plurality of second vectors.

In the encoding the plurality of features, the at least one instruction may be further configured to compare the plurality of second vectors with a predetermined threshold, and encode the plurality of features based on a result of the comparison such that a joint distribution of the plurality of second vectors for the plurality of first vectors has a sparsity.

In the encoding the plurality of features, the at least one instruction may be further configured to learn the plurality of encoded features by classifying the plurality of sample images based on the plurality of encoded features; and analyze the plurality of analysis target images based on the plurality of learned features when the plurality of analysis target images are received.

According to exemplary embodiments of the present disclosure, a quality of a target image can be evaluated more accurately and the target image can be accurately classified based on aesthetic factors of the image. Accordingly, the image analysis apparatus performing the image analysis method according to the present disclosure has advantageous effects of improving the accuracy of an algorithm for analyzing or classifying images.

BRIEF DESCRIPTION OF DRAWINGS

Exemplary embodiments of the present disclosure will become more apparent by describing in detail exemplary embodiments of the present disclosure with reference to the accompanying drawings, in which.

DESCRIPTION OF EXEMPLARY EMBODIMENTS

Figure 1:
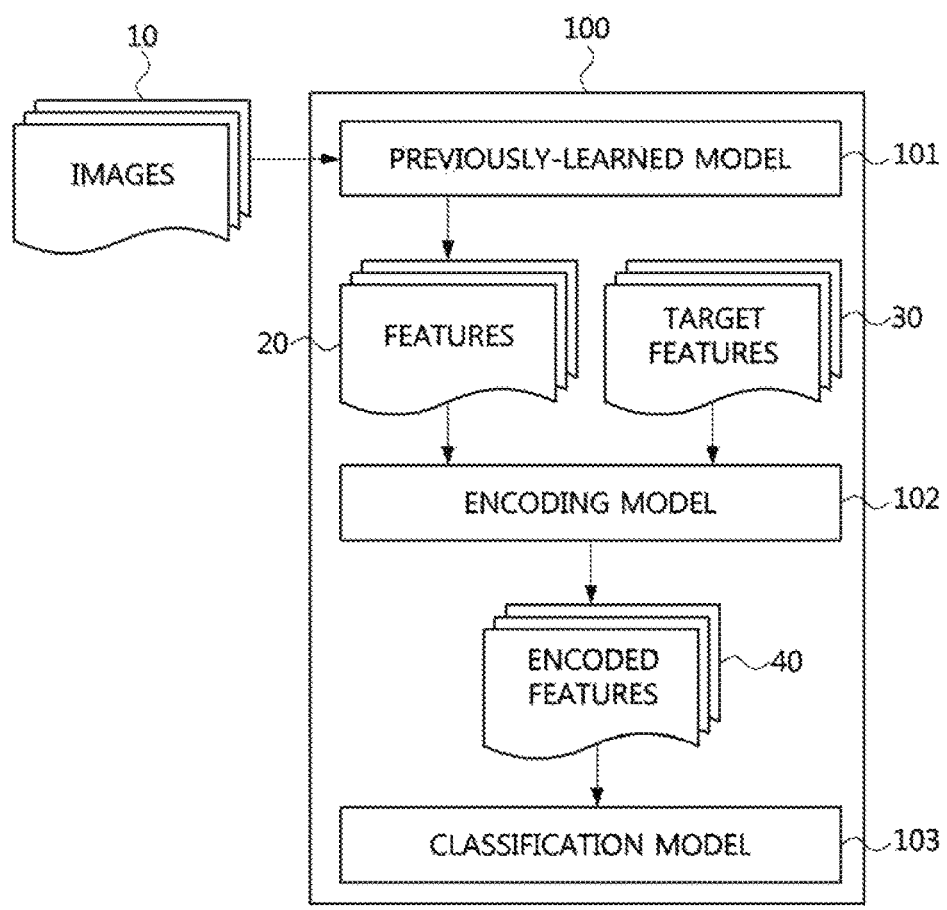
FIG. 1 is a conceptual diagram illustrating an image analysis method for extracting features of an image according to an exemplary embodiment of the present disclosure.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Combinations of respective blocks in an accompanying block diagram and respective operations in a flowchart may be performed by computer program instructions. These computer program instructions can be mounted on a processor of a general purpose computer, a special purpose computer, or other programmable data processing equipment, and thus the instructions performed by the processor of the computer or other programmable data processing equipment generate a means for performing functions described in the respective blocks of the block diagram or the respective operations of the flowchart. To implement functions in a specific way, these computer program instructions can be stored in a computer-usable or computer-readable memory capable of aiming for a computer or other programmable data processing equipment, so that the instructions stored in the computer-usable or computer-readable memory can also produce a manufactured item including an instruction means for performing functions described in the respective blocks of the block diagram or the respective operations of the flowchart.

In addition, each block or operation may indicate a part of a module, a segment or a code including one or more executable instructions for executing specific logical function(s). It should be noted that mentioned functions described in blocks or operations can be executed out of order in some alternative embodiments. For example, two consecutively shown blocks or operations can be performed substantially at the same time, or can be performed in a reverse order according to the corresponding functions.

Hereinafter, exemplary embodiments according to the present disclosure will be described in detail by referring to accompanying drawings. However, the exemplary embodiments according to the present disclosure may be changed into various forms, and thus the scope of the present disclosure is not limited to the exemplary embodiments which will be described. The exemplary embodiments are provided to assist the one of ordinary skill in the art. in gaining a comprehensive understanding of the methods, apparatuses, and/or systems described herein.

FIG. 1 is a conceptual diagram illustrating an image analysis method for extracting features of an image according to an exemplary embodiment of the present disclosure.

Referring to FIG. 1, an image analysis method for extracting features of an image according to an exemplary embodiment may be performed in an image analysis apparatus 100. The image analysis apparatus 100 may include a plurality of models according to respective functions to perform an image analysis method.

Specifically, the image analysis apparatus 100 may include a model 101 previously learned to extract features of a plurality of images 10, an encoding model 102 for encoding a plurality of features, and a classification model 103 for classifying a plurality of analysis target images. Here, the plurality of images 10 may mean sample images for extracting a plurality of features, and may have the same meaning as a plurality of sample images described later.

First, the image analysis apparatus 100 may extract a plurality of features 20 for the plurality of images 10 through the model 101 in which a plurality of images are learned in advance. Then, the image analysis apparatus 100 may determine a plurality of target features 30 indicating final features to be extracted through the image analysis apparatus 100. Then, the image analysis apparatus 100 may encode the plurality of features 20 through the encoding model 102 in consideration of the plurality of target features 30.

Thereafter, the image analysis apparatus 100 may classify the plurality of images 10 based on the plurality of encoded features 40 through the classification model 103. Through this, the image analysis apparatus 100 may learn the plurality of encoded features 40. Then, although not illustrated in FIG. 1, the image analysis apparatus 100 may analyze a plurality of analysis target images based on the plurality of learned features when the plurality of analysis target images are received.

The plurality of models included in the image analysis apparatus 100 performing the image analysis method according to an exemplary embodiment of the present disclosure described above may mean logical configurations rather than physical configurations. For example, the plurality of models may be implemented through at least one instruction executable by a processor included in the image analysis apparatus 100.

Hereinafter, specific configurations of the image analysis apparatus 100 for performing the image analysis method according to an exemplary embodiment of the present disclosure will be described with reference to FIG. 2.

Figure 2:
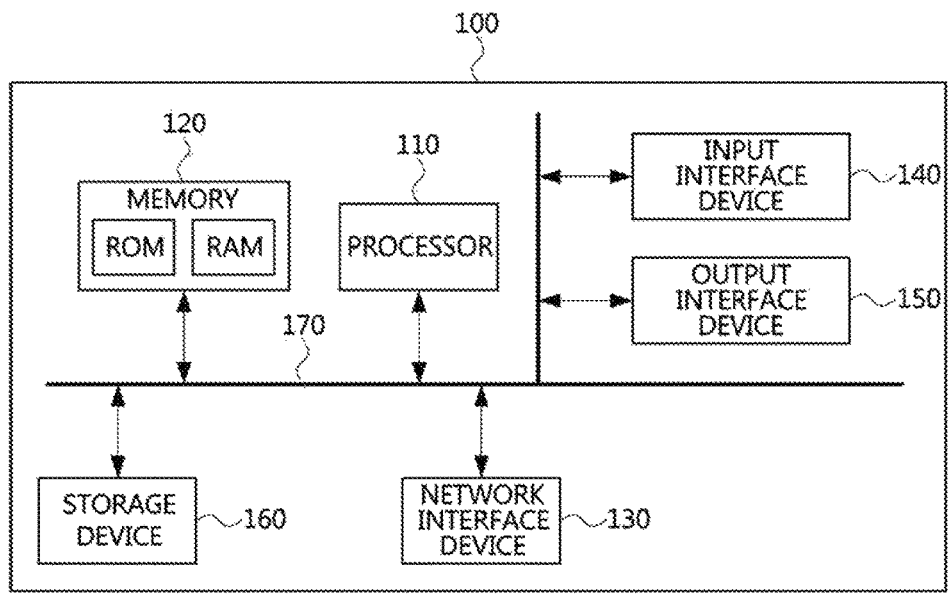
FIG. 2 is a block diagram illustrating an image analysis apparatus for performing an image analysis method for extracting features of an image according to an exemplary embodiment of the present disclosure.

FIG. 2 is a block diagram illustrating an image analysis apparatus for performing an image analysis method for extracting features of an image according to an exemplary embodiment of the present disclosure.

Referring to FIG. 2, an image analysis apparatus 100 for performing an image analysis method for extracting features of an image according to the present disclosure may include at least one processor 110, a memory 120, and a network interface device 130. Also, the image analysis apparatus 100 may further include an input interface device 140, an output interface device 150, a storage device 160, and the like. Each component included in the image analysis apparatus 100 may be connected by a bus 170 to perform communications with each other.

The processor 110 may execute program instructions stored in the memory 120 and/or the storage device 160. The processor 110 may refer to a central processing unit (CPU), a graphics processing unit (GPU), or a dedicated processor on which the methods according to the present disclosed are performed. The memory 120 and the storage device 160 may be composed of a volatile storage medium and/or a non-volatile storage medium. For example, the memory 120 may be comprised of read only memory (ROM) and/or random access memory (RAM). Here, the program instructions executed by the processor 110 may include a plurality of steps for performing an image analysis method for extracting features of an image proposed by the present disclosure.

Hereinafter, an image analysis method for extracting features of an image according to an exemplary embodiment of the present invention will be described in detail with reference to FIGS. 3 to 7. Also, the image analysis method described below may be performed in the image analysis apparatus 100 described with reference to FIGS. 1 and 2.

Figure 3:
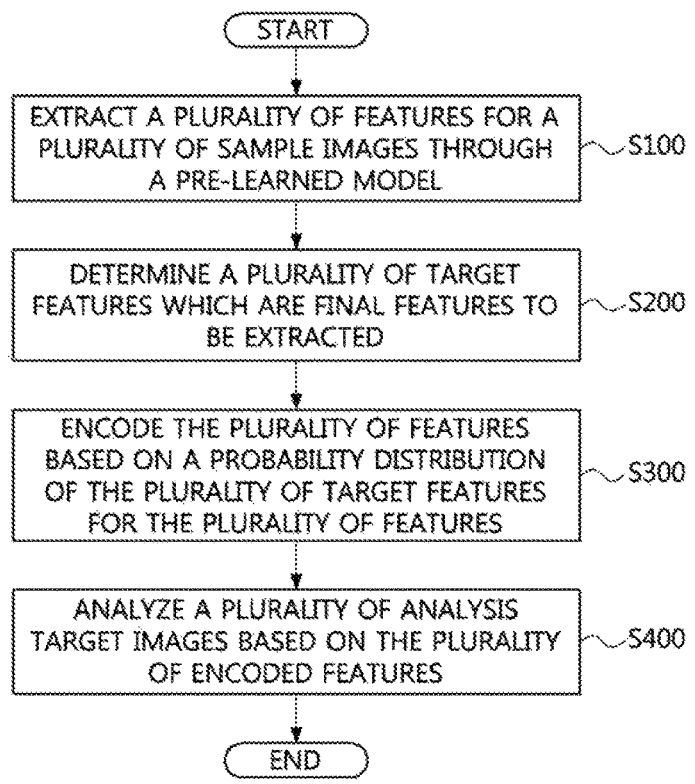
FIG. 3 is a flowchart explaining an image analysis method for extracting features of an image according to an exemplary embodiment of the present disclosure.

FIG. 3 is a flowchart explaining an image analysis method for extracting features of an image according to an exemplary embodiment of the present disclosure.

Referring to FIG. 3, an image analysis apparatus for performing the image analysis method may extract a plurality of features for a plurality of sample images through a pre-learned model for extracting features from the plurality of sample images (S100).

Specifically, the image analysis apparatus may be connected to a network (e.g., a communication network such as the Internet) through the network interface device 130 described with reference to FIG. 2, and may obtain the plurality of sample images through the network. Alternatively, the plurality of sample images may be stored in advance in the memory 120 or the storage device 160 described with reference to FIG. 2. For example, the plurality of sample images may refer to a plurality of images included in a dataset of ImageNet.

Also, the pre-learned model for extracting the features from the plurality of sample images may be a model that has been previously learned based on a deep convolutional neural network (DCNN) to extract features of the plurality of sample images. For example, the plurality of features extracted through the pre-learned model may refer to a plurality of features for the plurality of sample images obtained at a fully connected layer 1 (FC1) stage included in the DCNN.

Thereafter, the image analysis apparatus may determine a plurality of target features (S200), which are final features to be extracted through the image analysis apparatus. Here, the plurality of target features may include a feature for classifying the plurality of sample images according to qualities of the plurality of sample images and a feature for classifying the plurality of sample images according to aesthetic factors of the plurality of sample images.

For example, the qualities of the plurality of sample images may include high quality and low quality. In addition, the aesthetic factors of the plurality of sample images may include at least one of complementary color, motion blur, rule of thirds, depth of field (DOF), and vanishing point.

Thereafter, the image analysis apparatus may encode the plurality of features based on a probability distribution of the plurality of target features for the plurality of features (S300). A specific method for encoding the plurality of features in the image analysis apparatus may be described below referring to FIGS. 4 to 6.

Figure 4:
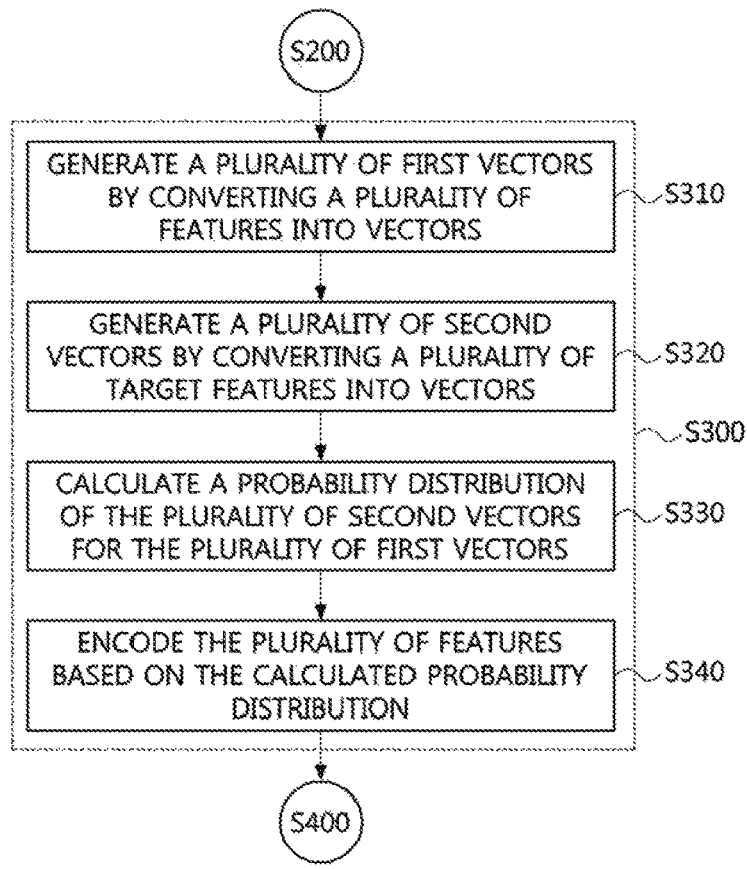
FIG. 4 is a flow chart explaining a method of encoding a plurality of features in an image analysis method for extracting features of an image according to an exemplary embodiment of the present disclosure.

FIG. 4 is a flow chart explaining a method of encoding a plurality of features in an image analysis method for extracting features of an image according to an exemplary embodiment of the present disclosure.

Referring to FIG. 4, the image analysis apparatus may generate a plurality of first vectors by converting a plurality of features into vectors (S310). Then, the image analysis apparatus may convert the plurality of target features into vectors to generate a plurality of second vectors (S320). Then, the image analysis apparatus may calculate a probability distribution of the plurality of second vectors for the plurality of first vectors (S330). Thereafter, the image analysis apparatus may encode the plurality of features based on the calculated probability distribution (S340).

Figure 5:
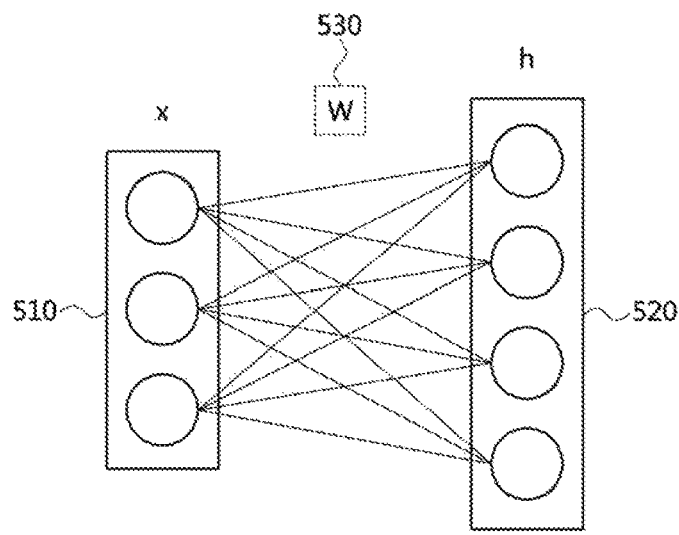
FIG. 5 is a conceptual diagram illustrating an RBM model applied to an image analysis method for extracting features of an image according to an exemplary embodiment of the present disclosure.

Specifically, the image analysis apparatus may encode the plurality of features through a restricted Boltzmann machines (RBM) model that classifies the plurality of first vectors based on a joint distribution of the plurality of second vectors. Here, the RBM model is referred to as a limited Boltzmann machine, and may have a form as illustrated in FIG. 5. Hereinafter, with reference to FIG. 5, a concrete method of encoding the plurality of features by the image analysis apparatus may be described.

FIG. 5 is a conceptual diagram illustrating an RBM model applied to an image analysis method for extracting features of an image according to an exemplary embodiment of the present disclosure.

Referring to FIG. 5, an RBM model used in the image analysis method for extracting features of an image may include an input vector x 510, a hidden vector h 520, and weights W 530 for the input vector x. The RBM model may also refer to a bipartite graph capable of modeling a joint distribution of the input vector x 510 and the hidden vector h 520. Here, the input vector x 510 may be expressed as $x=[x_1, \ldots, x_L]^T$, and the hidden vector h 520 may be represented as $h=[h_1, \ldots, h_D]^T$.

When such the RBM model is applied to the image analysis method according to an exemplary embodiment, the input vector x 510 of the RBM model may mean the plurality of first vectors generated by converting the plurality of features into vectors. Also, the hidden vector h 520 of the RBM model may mean the plurality of encoded features. Specifically, the joint distribution in the RBM model may be defined as a below equation 1.

$$p(x, h) = \frac{1}{Z}\exp(-E(x, h)) \qquad \text{[Equation 1]}$$

In the above equation 1, 'E' may denote an energy function, and 'Z' may denote a partition function. In particular, the Z that is a partition function may be defined as a below equation 2. Also, E(x,h) that is an energy function may be defined by a below equation 3.

$$Z = \Sigma_{x',h'} e^{-E(x',h')} \qquad \text{[Equation 2]}$$

$$E(x,h) = -h^T W x - b^T h - c^T x \qquad \text{[Equation 3]}$$

In the above equation 2, 'W' ($W \in R^{D \times L}$), 'b' ($b \in R^{D \times 1}$) and 'c' ($W \in R^{L \times 1}$) may represent basic parameters representing the RBM model. Accordingly, a probability of the input vector x 510 in the RBM model may be defined as a below equation 4.

$$p(x) = \frac{1}{Z}\sum_{h} \exp(-E(x, h)) \qquad \text{[Equation 4]}$$

Also, a conditional probability of the input vector x 510 for the hidden vector h 520 may be defined as a below equation 5. Also, a conditional probability for the hidden vector h 520 for the input vector x 510 may be defined as a below equation 6.

$$p(x \mid h) = \prod_{l=1}^{L} p(x_l \mid h) = \prod_{l=1}^{L} \sigma\left(\sum_{d} \omega_{d,l} h_d + c_l\right) \qquad \text{[Equation 5]}$$

$$p(h \mid x) = \prod_{d=1}^{D} p(h_d \mid x) = \prod_{d=1}^{D} \sigma\left(\sum_{l} \omega_{d,l} x_l + b_d\right) \qquad \text{[Equation 6]}$$

In the equations 5 and 6, '$\sigma(r)$' may mean a sigmoid function and it may be represented as $\sigma(r)=(1+e^{-r})^{-1}$. Also, the RBM model may encode the input vector x 510 by minimizing the negative log likelihood (NLL).

$$\operatorname*{argmin}_{\{W,b,c\}} -\sum_{x \in X} \log p(x) \qquad \text{[Equation 7]}$$

Specifically, the RBM model may update the parameters of the equation 7 based on Gibbs sampling and gradient decent. Through this, the RBM model may efficiently learn based on contrast divergence. That is, the RBM model may update the parameters based on the update method represented by a below equation 8.

$$\Delta \omega_{l,d} \propto \langle x_l h_d \rangle_0 - \langle x_l h_d \rangle_T,$$

$$\Delta b_d \propto \langle h_d \rangle_0 - \langle h_d \rangle_T$$

$$\Delta c_l \propto \langle x_l \rangle_0 - \langle x_l \rangle_T \quad \text{[Equation 8]}$$

In the equation 8, '⟨•⟩' may mean an average value of the learning object, and 'T' may mean the number of Gibbs sampling. Through the above-described process, the image analysis apparatus may encode the plurality of features through the RBM model.

In this case, in the process of encoding the plurality of features through the RBM model, the image analysis apparatus may encode the plurality of features such that a cross entropy value is minimized to minimize a difference between the plurality of first vectors and the plurality of second vectors. Specifically, the process of encoding the plurality of features such that the cross entropy value is minimized in the image analysis apparatus may be expressed as a below equation 9.

$$\underset{\{W,b,c\}}{\operatorname{argmin}} - \sum_{i=1}^{N} \log p(x_i) - \lambda \sum_{d=1}^{D} H(f_{i,d}, h_{i,d}) \quad \text{[Equation 9]}$$

In the equation 9, 'h' denotes the hidden vector h 520, and thus it may also mean the plurality of first vectors into which the plurality of features are converted. Also, in the equation 9, 'f' denotes a target vector, and thus it may mean the plurality of second vectors into which the plurality of target features are converted. Also, in the equation 9, '$H(f_{i,d}, h_{i,d}, d)$' denotes an intersection entropy loss, and may be represented as $H(f_{i,d}, h_{i,d}) = -f_{i,d} \log h_{i,d} - (1-f_{i,d}) \log(1-h_{i,d})$. Here, a method of updating the parameters according to the cross entropy in the RBM model may be expressed as a below equation 10.

$$\Delta \omega_{l,d} \propto \langle x_l z_d \rangle_0 - \langle x_l h_d \rangle_T \quad \text{[Equation 10]}$$

In the equation 10, '$z_d$' may mean a weighted sum of the hidden vector h 520 and the target vector f, and may be represented as $z_d = (1-\alpha)h_d + \alpha f_d$. In the equation 10, when $\alpha=0$ or $h_d = f_d$, the equation 10 may be the same as the equation 8.

Through the above-described process, the image analysis apparatus for performing the image analysis method for image feature extraction according to an exemplary embodiment may encode the plurality of features. Further, the image analysis apparatus of the present disclosure may share the plurality of target features in the hidden vector in order to encode the plurality of features in consideration of the plurality of target features. That is, the image analysis apparatus may clarify a range for each target feature contained in the plurality of target features. Accordingly, the equation 9 may be changed to a below equation 11.

$$\underset{\{W,b,c\}}{\operatorname{argmin}} - \sum_{i=1}^{N} \log p(x_i) - \lambda \sum_{d=1}^{D} H(f_{g(i),d}, h_{i,d}) \quad \text{[Equation 11]}$$

In the equation 11, 'g(i)' may mean a class label of the i-th learning data, and may be represented as g(i)={1, 2, ... C}. Also, the image analysis apparatus may appropriately define a plurality of target vectors according to the respective target vectors.

Specifically, in the present disclosure, the image analysis apparatus may encode the plurality of features in consideration of discrimination and sparseness of a plurality of target features. Hereinafter, with reference to FIG. 6, a concrete method of encoding the plurality of features in consideration of discrimination and sparseness of the plurality of target features may be described.

Figure 6:
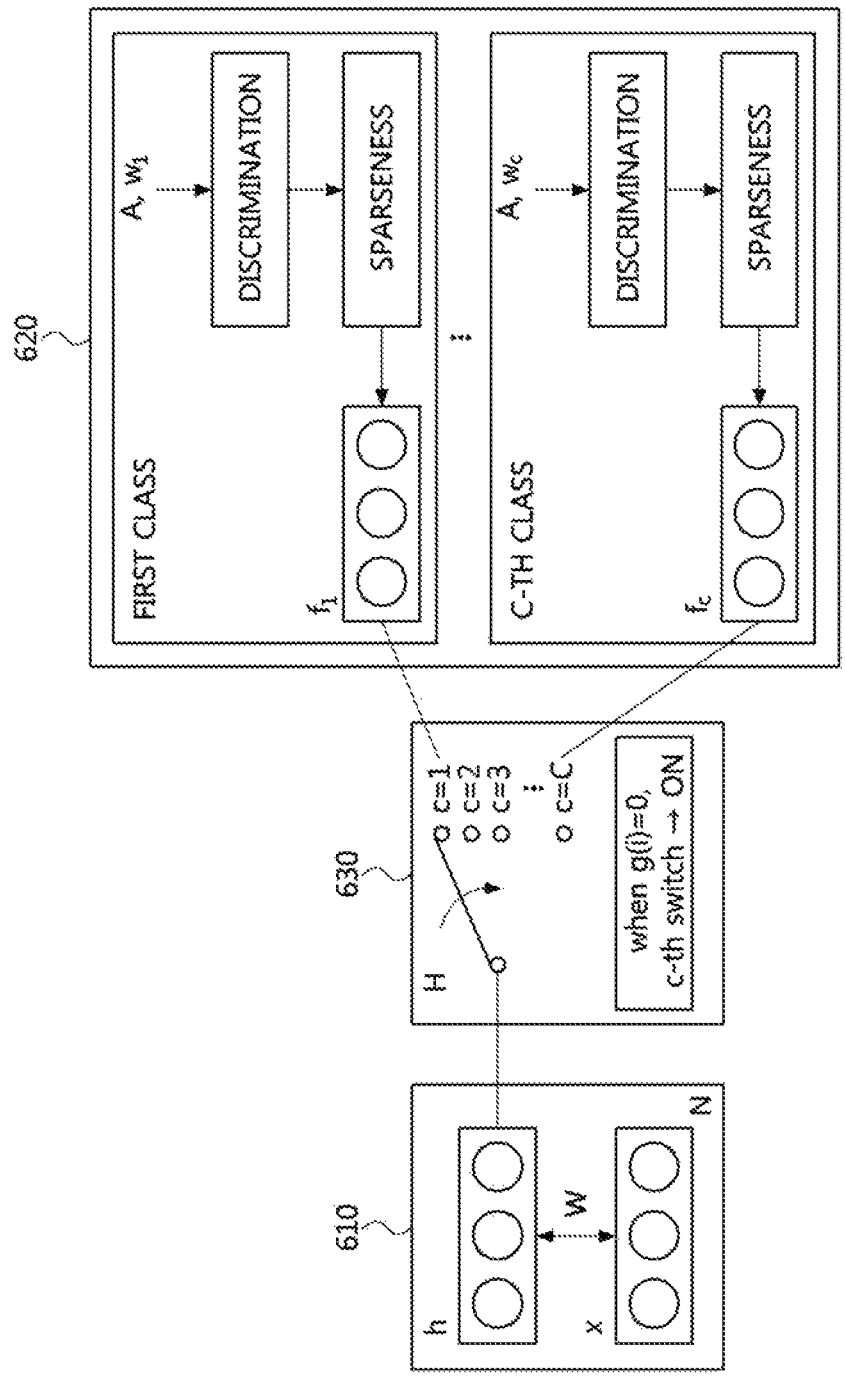
FIG. 6 is a conceptual diagram illustrating an SVM-based SRBM model applied to an image analysis method for extracting features of an image according to an exemplary embodiment of the present disclosure.

FIG. 6 is a conceptual diagram illustrating an SVM-based SRBM model applied to an image analysis method for extracting features of an image according to an exemplary embodiment of the present disclosure.

Referring to FIG. 6, a logical structure of an encoding model, which is used for the image analysis apparatus of the present disclosure to encode a plurality of features, is illustrated. Here, the encoding model used in the image analysis apparatus may be referred to as a support vector machine (SVM) based sparse restricted Boltzmann machine (SRBM) model.

Specifically, the SVM-based SRBM model used in the image analysis apparatus of the present disclosure may classify the RBM model N 610 into class-specific target vectors 620. Here, the class-specific target vectors may mean definitions of the respective target vectors ($f_c = [f_1, \ldots, f_d]^T$). That is, the image analysis apparatus may control the hidden vector h of the RBM model to share the plurality of target features through the cross entropy loss control module H 630.

Also, the image analysis apparatus may define each target vector in consideration of the discrimination and sparseness among the target features included in the class-specific target vectors 620. In other words, the image analysis apparatus may define each of the plurality of second vectors so that the plurality of second vectors are different from each other for discrimination among the plurality of second vectors. Also, the image analysis apparatus may define each of the plurality of second vectors so that the joint distribution of the plurality of second vectors and the plurality of first vectors has sparseness.

First, the image analysis apparatus may encode a plurality of features by applying the plurality of features to a classification model previously learned based on SVM so that a plurality of second vectors have discrimination for distinguishing between the plurality of second vectors. Here, the SVM may mean a model that has been learned in advance to discriminate or classify a plurality of features. That is, the image analysis apparatus may define a plurality of target vectors representing a plurality of target features with differentiation through a model that is learned in advance based on the SVM, and may encode the plurality of features based on the target vectors.

Specifically, a concrete method of defining a plurality of target vectors having differentiations through a model that has been previously learned based on the SVM in the image analysis apparatus may be expressed as a below equation 12.

$$\underset{\Phi_c}{\operatorname{argmax}} w_c^T(A\Phi_c) + z_c - \frac{1}{C-1} \sum_{c' \in C} w_{c'}^T(A\Phi_c) + z_{c'} \quad \text{[Equation 12]}$$

That is, the image analysis apparatus may define the plurality of target vectors to have differentiations based on information ($w_c \in R^{D \times 1}$, $z_c$) obtained through the SVM-based pre-learned model. The image analysis apparatus assumes that $f_c = A\Phi_c$ representing each target vector is modeled as a linear combination of K basis vectors ($A = [\alpha_1, \alpha_2, \ldots,$ $\alpha_K]^T$). Then, the image analysis apparatus may calculate $\Phi_c=[\phi_{c,1}, \phi_{c,2}, \ldots, \phi_{c,K}]^T$, whereby each target vector fc may be defined.

In addition, the image analysis apparatus may compare the values of the plurality of second vectors with predetermined threshold values so that the joint distribution of the plurality of second vectors with respect to the plurality of first vectors has sparsity, and encode the plurality of features based on the result of the comparison.

Specifically, the image analysis apparatus may model the plurality of target vectors to have sparseness based on a sparsity model that can give sparsity to the plurality of target vectors. Here, the plurality of target vectors to which the sparsity is given based on the sparsity model may be expressed by a below equation 13.

$$f_{c,d} = (R(f_{c,d}, fc))^{(\frac{1}{\mu})-1}$$ [Equation 13]

In the equation 13, '$R(f_{c,d}, fc)$' denotes a function of assigning a value between 0 and 1 based on the rank of $f_{c,d}$ included in the plurality of target vectors fc. For example, if $\mu$ is less than 0.5, the image analysis apparatus may determine the remaining target vector as 0 excluding at least one target vector having a value larger than a predetermined threshold value at fc. Through such the method, the image analysis apparatus may define a plurality of target vectors having sparsity, and may encode a plurality of features based on the sparsity. Through the above-described process, the image analysis apparatus may encode a plurality of features in consideration of the discrimination and the sparsity of a plurality of target features.

The SVM-based SRBM model of the present disclosure described above may be repeated a predetermined number of times. The fact that the SVM-based SRBM model is repeated a predetermined number of times may mean that the number of times the parameters included in the SRBM model are updated may be preset. That is, the image analysis apparatus may define a plurality of target features by repeating the SVM-based SRBM model a predetermined number of times, and may encode a plurality of features based on the target features.

Meanwhile, referring again to FIG. 1, when a plurality of analysis target images are received by the image analysis apparatus, the image analysis apparatus may analyze the plurality of analysis target images based on the plurality of encoded features (S400). More specifically, a method of analyzing a plurality of analysis target images in the image analysis apparatus may be described with reference to FIG. 7.

Figure 7:
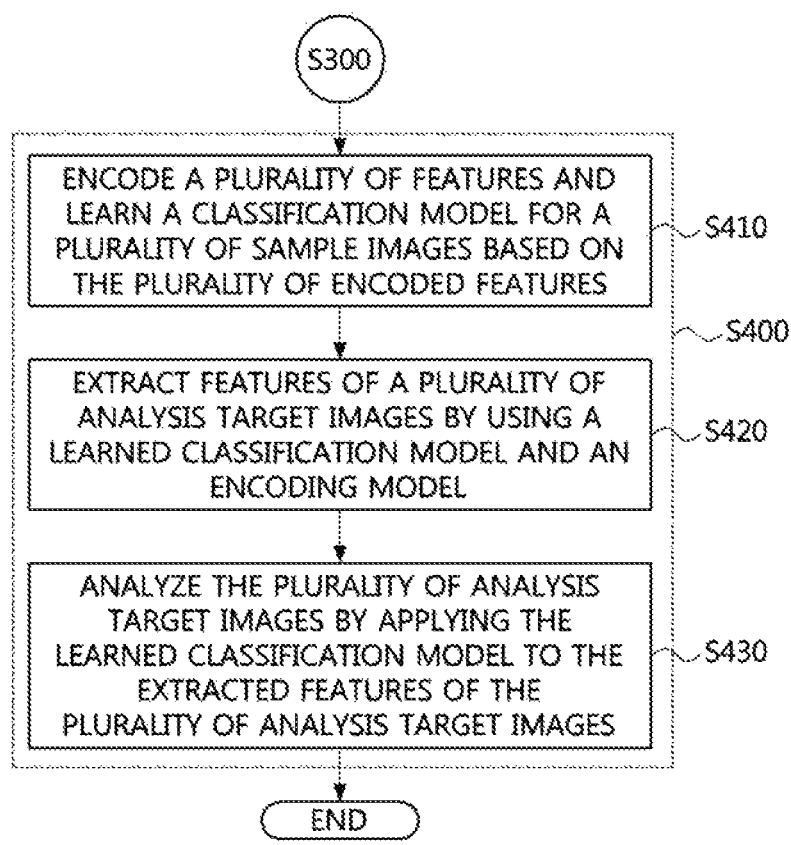
FIG. 7 is a flowchart explaining a method of analyzing a plurality of analysis target images in an image analysis method for extracting features of an image according to an exemplary embodiment of the present disclosure.

FIG. 7 is a flowchart explaining a method of analyzing a plurality of analysis target images in an image analysis method for extracting features of an image according to an exemplary embodiment of the present disclosure.

Referring to FIG. 7, the image analysis apparatus may encode a plurality of features and learn a classification model for a plurality of sample images based on the plurality of encoded features (S410). Then, when a plurality of analysis target images are received, the image analysis apparatus may extract features of the plurality of analysis target images by using the learned classification model and an encoding model (S420). Thereafter, the image analysis apparatus may analyze the plurality of analysis target images by applying the learned classification model to the extracted features of the plurality of analysis target images (S430).

For example, a feature related to high quality and low quality may be included in the plurality of target features as a feature for classifying images based on image quality. Also, a feature related to the motion blur may be included in the plurality of target features as a feature for classifying images based on aesthetic factors of the images.

In this case, since the image analysis apparatus encodes a plurality of features based on a plurality of target features, the plurality of analysis target images may be classified into high-quality images and low-quality images. In addition, the image analysis apparatus may extract an image having the feature of motion blur among the plurality of analysis target images.

The image analysis method for extracting features of an image according to an exemplary embodiment of the present disclosure described above with reference to FIGS. 3 to 7 was explained to be applied to an analysis of a plurality of analysis target images based on a plurality of predetermined target features. However, the image analysis method according to the present disclosure is not limited thereto. That is, the image analysis method according to the present disclosure may be applied to a field of extracting features included in data or classifying various kinds of data, in addition to extracting or classifying features from a plurality of images.

The methods according to forms of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An image analysis method performed in an image analysis apparatus, the method comprising:
   extracting a plurality of features for a plurality of sample images through a pre-learned model to extract features from the plurality of sample images;
   determining a plurality of target features representing final features to be extracted through the image analysis apparatus;
   encoding the plurality of features based on a probability distribution of the plurality of target features for the plurality of features; and
   analyzing a plurality of analysis target images based on the plurality of encoded features when the plurality of analysis target images are received,
   wherein the encoding the plurality of features comprises:
      converting the plurality of features into vectors to generate a plurality of first vectors;

converting the plurality of target features into vectors to generate a plurality of second vectors;

calculating a probability distribution of the plurality of second vectors for the plurality of first vectors; and encoding the plurality of features based on the calculated probability distribution.

2. The image analysis method according to claim 1, wherein the pre-learned model is a pre-learned model based on a deep convolution neural network (DCNN) to extract the features of the plurality of sample images.

3. The image analysis method according to claim 1, wherein the plurality of target features include a feature for classifying based on qualities of the plurality of sample images, and the qualities of the plurality of sample images include high quality and low quality.

4. The image analysis method according to claim 1, wherein the plurality of target features include a feature for classifying based on aesthetic factors of the plurality of sample images, and the aesthetic factors of the plurality of sample images include at least one of a complementary color, a motion blur, a rule of thirds, a depth of field (DOF), and a vanishing point.

5. The image analysis method according to claim 1, wherein, in the encoding the plurality of features, the plurality of features are encoded through a restricted Boltzmann machines (RBM) model that classifies the plurality of first vectors based on a joint distribution of the plurality of second vectors.

6. The image analysis method according to claim 5, wherein, in the encoding the plurality of features, the plurality of features are encoded such that a cross entropy value is minimized to minimize a difference between the plurality of first vectors and the plurality of second vectors.

7. The image analysis method according to claim 5, wherein, in the encoding the plurality of features, the plurality of features are encoded by applying a classification model pre-learned based on support vector machine (SVM) so that the plurality of second vectors have differentiations for distinguishing between the plurality of second vectors.

8. The image analysis method according to claim 5, wherein, in the encoding the plurality of features, the plurality of second vectors are compared with a predetermined threshold, and the plurality of features are encoded based on a result of the comparison such that a joint distribution of the plurality of second vectors for the plurality of first vectors has a sparsity.

9. The image analysis method according to claim 1, wherein the analyzing the plurality of analysis target images comprises:

learning the plurality of encoded features by classifying the plurality of sample images based on the plurality of encoded features; and analyzing the plurality of analysis target images based on the plurality of learned features when the plurality of analysis target images are received.

10. An image analysis apparatus comprising:

a processor; and a memory storing at least one instruction, when executed by the processor, causes the processor to perform operations comprising:

extracting a plurality of features for a plurality of sample images through a pre-learned model to extract features from the plurality of sample images;

determining a plurality of target features representing final features to be extracted through the image analysis apparatus;

encoding the plurality of features based on a probability distribution of the plurality of target features for the plurality of features; and analyzing a plurality of analysis target images based on the plurality of encoded features when the plurality of analysis target images are received, wherein the encoding the plurality of features comprises:

converting the plurality of features into vectors to generate a plurality of first vectors;

converting the plurality of target features into vectors to generate a plurality of second vectors;

calculating a probability distribution of the plurality of second vectors for the plurality of first vectors; and encoding the plurality of features based on the calculated probability distribution.

11. The image analysis apparatus according to claim 10, wherein the pre-learned model is a pre-learned model based on a deep convolution neural network (DCNN) to extract the features of the plurality of sample images.

12. The image analysis apparatus according to claim 10, wherein the plurality of target features include a feature for classifying based on qualities of the plurality of sample images, and the qualities of the plurality of sample images include high quality and low quality.

13. The image analysis apparatus according to claim 10, wherein the plurality of target features include a feature for classifying based on aesthetic factors of the plurality of sample images, and the aesthetic factors of the plurality of sample images include at least one of a complementary color, a motion blur, a rule of thirds, a depth of field (DOF), and a vanishing point.

14. The image analysis apparatus according to claim 10, wherein, in the encoding the plurality of features, the at least one instruction is further configured to encode the plurality of features through a restricted Boltzmann machines (RBM) model that classifies the plurality of first vectors based on a joint distribution of the plurality of second vectors.

15. The image analysis apparatus according to claim 14, wherein the encoding the plurality of features comprises encoding the plurality of features such that a cross entropy value is minimized to minimize a difference between the plurality of first vectors and the plurality of second vectors.

16. The image analysis apparatus according to claim 14, wherein the encoding the plurality of features comprises encoding the plurality of features by applying a classification model pre-learned based on support vector machine (SVM) so that the plurality of second vectors have differentiations for distinguishing between the plurality of second vectors.

17. The image analysis apparatus according to claim 14, wherein the encoding the plurality of features comprises:

comparing the plurality of second vectors with a predetermined threshold; and encoding the plurality of features based on a result of the comparison such that a joint distribution of the plurality of second vectors for the plurality of first vectors has a sparsity.

18. The image analysis apparatus according to claim 10, wherein the encoding the plurality of features comprises:

learning the plurality of encoded features by classifying the plurality of sample images based on the plurality of encoded features; and analyzing the plurality of analysis target images based on the plurality of learned features when the plurality of analysis target images are received.

\* \* \* \* \*